United States Patent [19]
Ross et al.

[11] 3,910,439
[45] Oct. 7, 1975

[54] MOBILE PLATFORM STRUCTURE FOR FRUIT PICKERS

[75] Inventors: John M. Ross, Upland; Ronald T. Smith, Ontario, both of Calif.

[73] Assignee: Sunkist Growers, Inc., Sherman Oaks, Calif.

[22] Filed: Dec. 21, 1971

[21] Appl. No.: 210,520

Related U.S. Application Data

[62] Division of Ser. No. 31,924, April 27, 1970, Pat. No. 3,690,092.

[52] U.S. Cl. ............... 214/520; 214/83.1; 182/223; 182/131
[51] Int. Cl.² .......................... B60P 1/36; B60P 1/64
[58] Field of Search ................... 214/83.1, 506, 520; 53/390, 391; 56/128 R; 182/63, 113, 131, 62.5, 223; 186/222

[56] References Cited
UNITED STATES PATENTS

| | | | |
|---|---|---|---|
| 849,222 | 4/1907 | Fleming | 182/141 X |
| 1,774,268 | 8/1930 | Harding | 182/223 |
| 1,953,390 | 4/1934 | Bosch | 182/2 X |
| 2,450,152 | 9/1948 | Miller | 214/83.1 |
| 3,088,609 | 5/1963 | Franzen | 214/83.1 |
| 3,182,827 | 5/1965 | Frost | 214/83.1 |
| 3,282,378 | 11/1966 | Pierce | 182/113 |
| 3,335,887 | 8/1967 | Snook | 214/506 |
| 3,356,181 | 12/1967 | Granger | 182/131 X |
| 3,437,174 | 4/1969 | Coblentz et al. | 214/83.1 X |
| 3,523,404 | 8/1970 | Girardi | 53/391 |
| 3,556,254 | 1/1971 | Lambert | 182/223 |
| 3,633,336 | 1/1972 | Rempel | 214/83.1 X |
| 3,641,738 | 2/1972 | Johnson | 214/83.1 X |

Primary Examiner—Albert J. Makay
Attorney, Agent, or Firm—Paul A. Weilein

[57] ABSTRACT

A self-propelled vehicle for travel between two rows of fruit trees has platforms for pickers at different levels that are extendable in opposite directions into the two rows of trees. Hopper means is provided at the outer end of each of the extendable platforms to receive the fruit picked by a workman and the hopper means has a resiliently yieldable wall against which the workman leans to reach out for the fruit.

33 Claims, 14 Drawing Figures

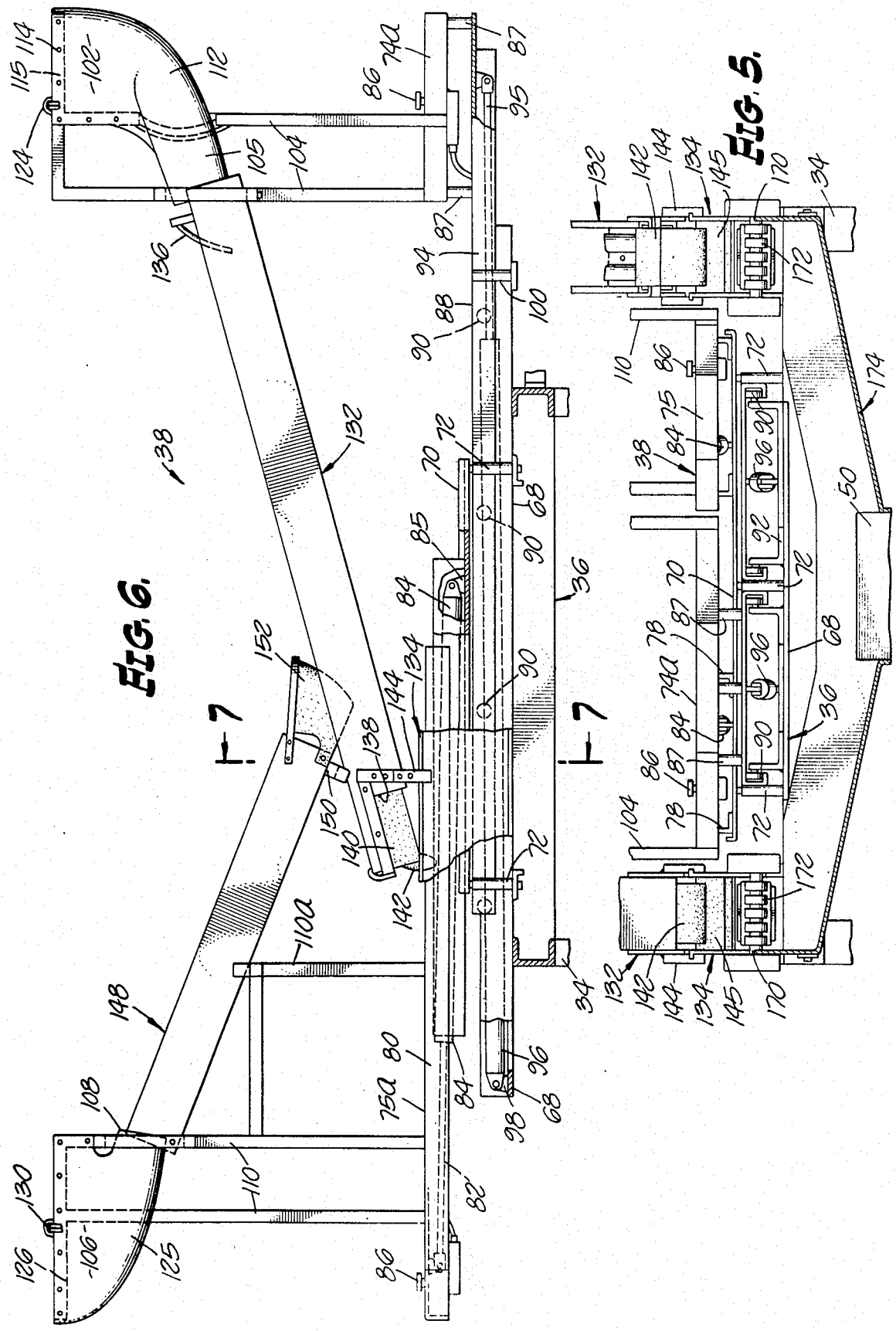

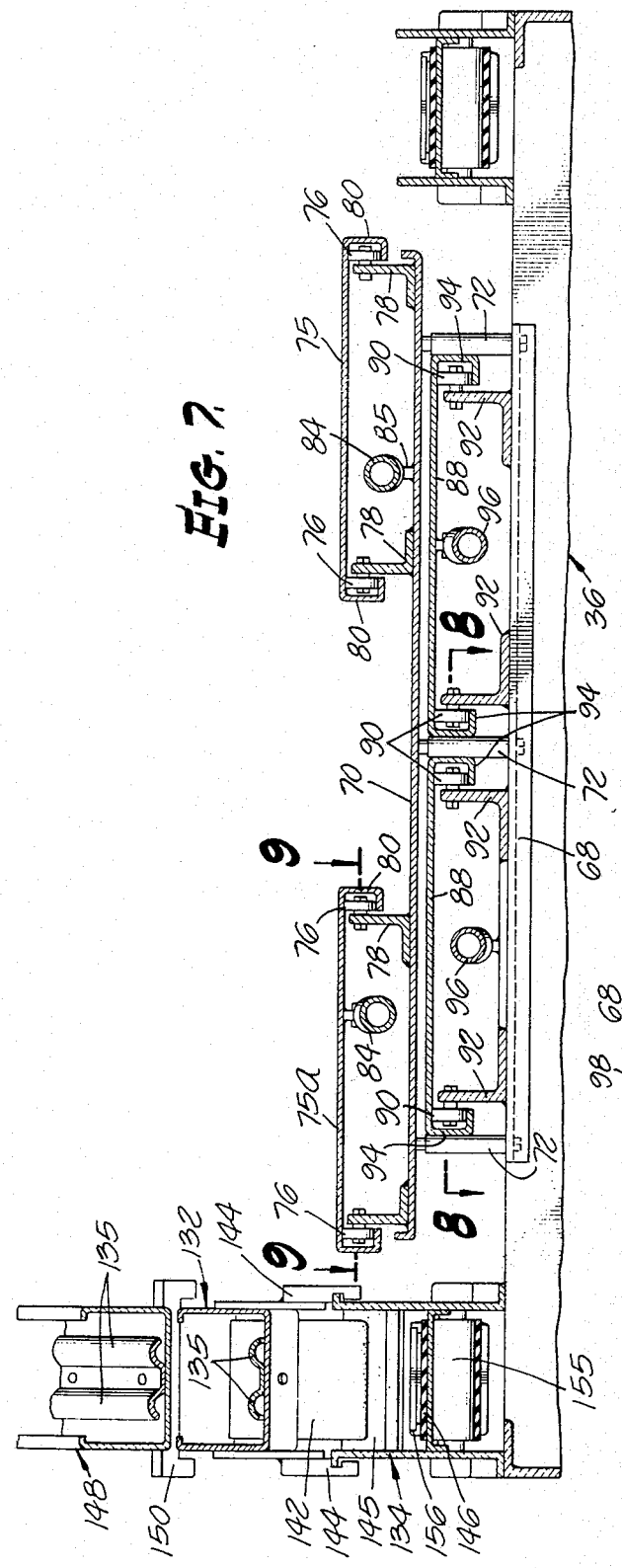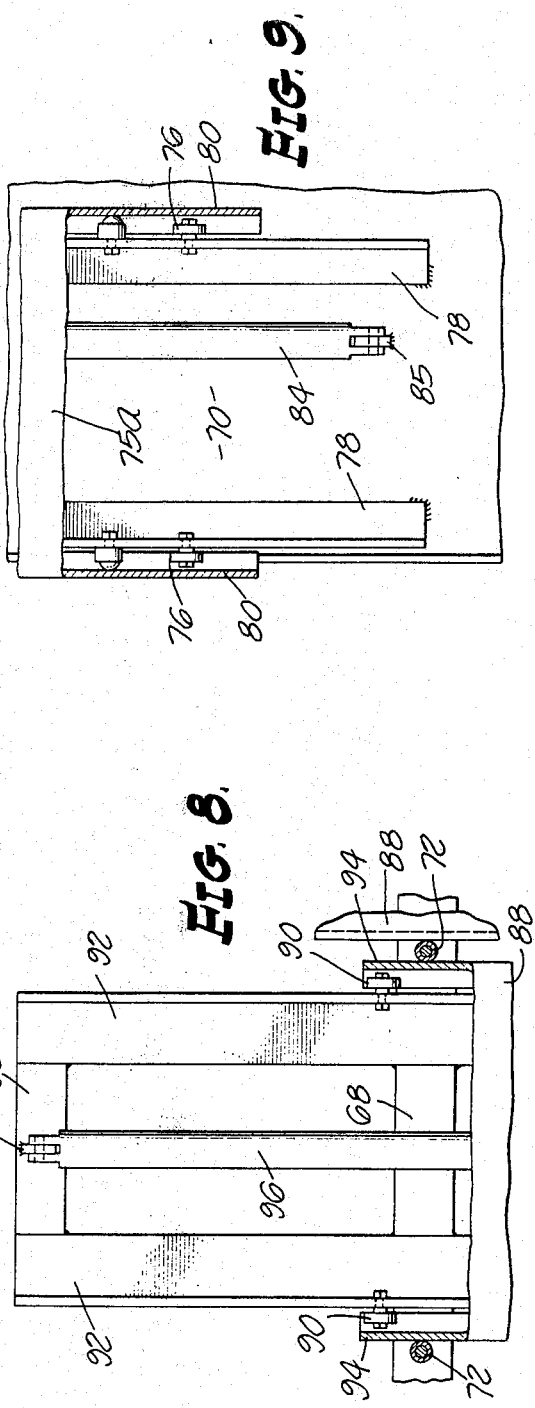

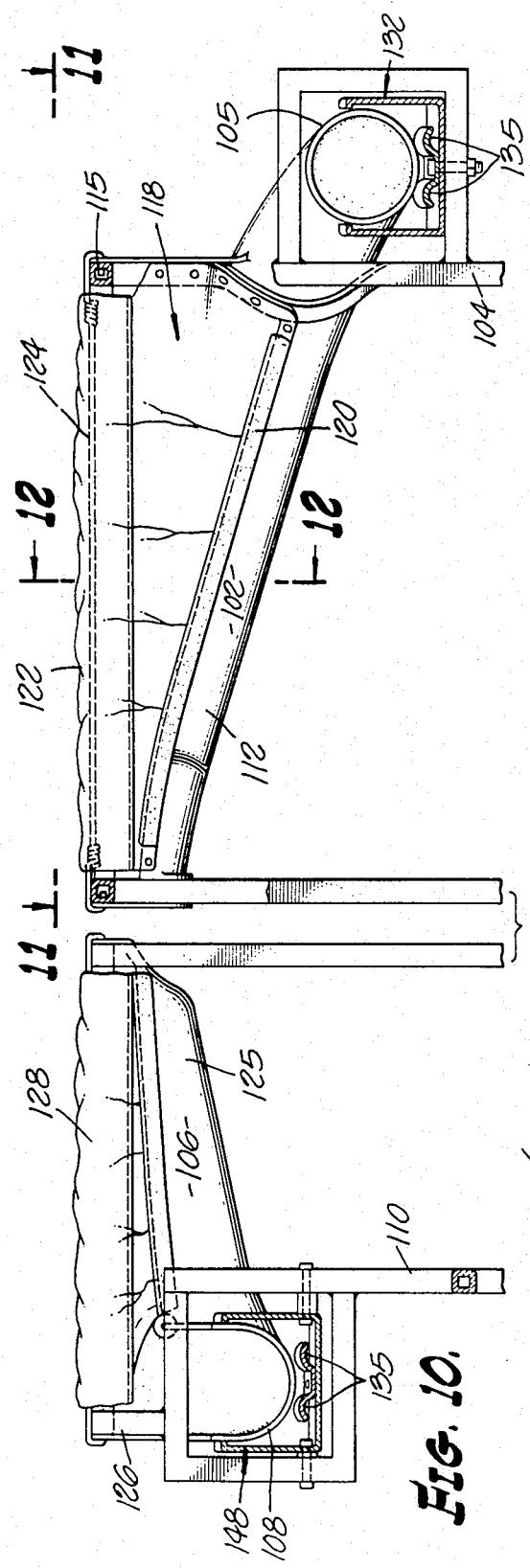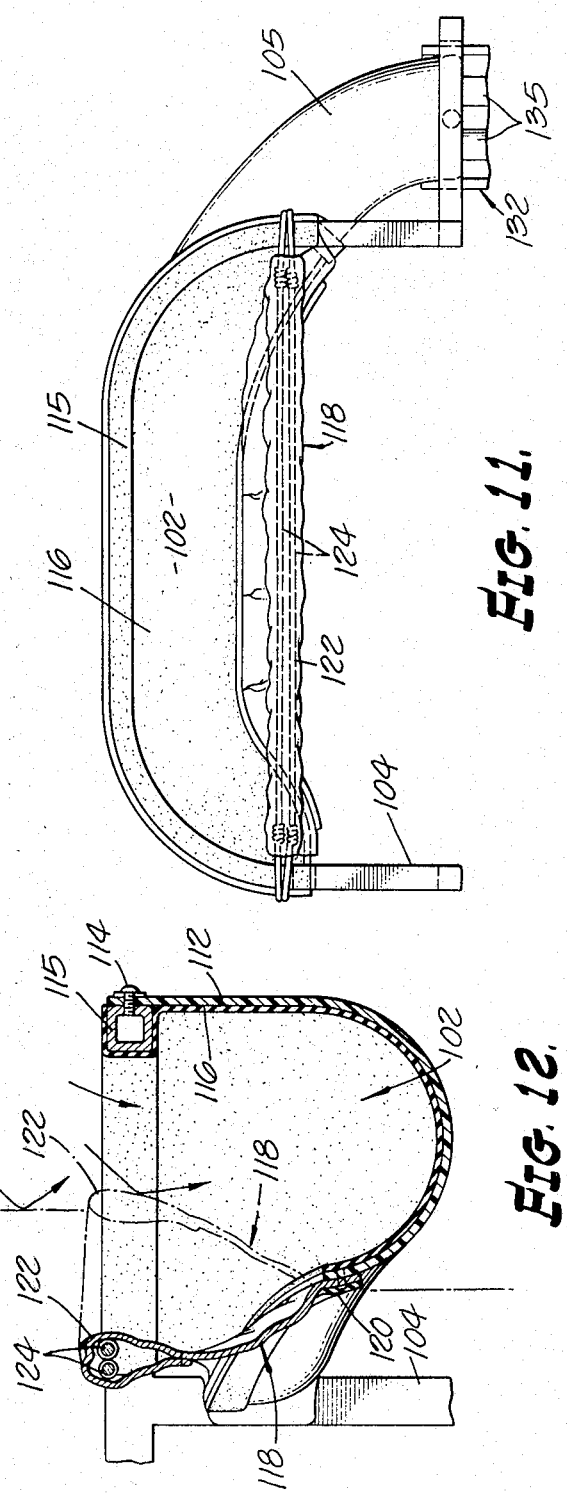

MOBILE PLATFORM STRUCTURE FOR FRUIT PICKERS

This is a division of application Ser. No. 31,924, filed Apr. 27, 1970 now issued as U.S. Pat. No. 3,690,092.

BACKGROUND OF THE INVENTION

Fruit picked from trees in an orchard must be delivered to field bins or boxes on the ground which are taken to a central pickup station for subsequent transportation from the orchard. Because it is time-consuming and expensive to use crews of pickers that carry sacks and use individual ladders, various labor-saving mobile platform structures have been developed to facilitate the picking of fruit from trees. There is still need, however, to eliminate manual effort and time-consuming motion both in picking the fruit from the trees and in delivering the fruit to the field bins. Ideally, such a labor-saving platform structure should be capable of use between two rows of trees for harvesting fruit from the two rows simultaneously with power means on the platform structure to pick up empty field bins and to deposit full field bins en route. The present invention is directed to this ideal.

SUMMARY OF THE INVENTION

A self-propelled vehicle has three platform assemblies at three different levels, each assembly comprising two platforms that are variably extendable in their planes in one lateral direction from the vehicle and two platforms that are variably extendable in the same manner in the opposite lateral direction. Each platform has a hopper at its leading end to receive picked fruit and a conveyor system is effective at all positions of extension of the platform to transport fruit from the hopper to successive field bins at a bin-filling station on the vehicle. Each hopper at the outer end of each extendable platform has a resiliently yieldable wall against which a workman on the platform may lean to reach out for fruit on the trees. The yielding action of the hopper wall increases the comfort of the workman and enables him to reach out further for fruit than he would be able to reach if the wall were rigid. It is also to be noted that the yieldable wall is elastic and when leaned against stores energy to facilitate disengagement of the workman from the wall when he so desires.

The conveyor system includes a gravity conveyor which receives the picked fruit at different levels and permits the fruit to fall therethrough by increments of fall that are too small to damage the fruit. The successive empty field bins are positioned at the bin-filling station under the gravity conveyor and the gravity conveyor is capable of downward extension into the empty bins and upward retraction to clear the full bins.

A lift fork incorporated into the front end of the vehicle picks up empty or partially filled bins in the path of the vehicle and bin conveyor means moves the empty bins to the bin-filling station and subsequently moves the full bins from the bin-filling station to a ramp means on the rear end of the vehicle where the full bins are lowered to the ground.

A suitable internal combustion power plant on the vehicle provides hydraulic power for a number of different purposes, including: actuation of portions of the fruit conveyor system; actuation of the lift fork; actuation of the bin conveyor means; extension and retraction of the individual platforms; actuation of the ground wheels to propel the vehicle; and power steering of the vehicle. The extension and retraction of the platforms is controlled by three-position foot pedals on the individual platforms and the driver of the vehicle operates remote controls for the lift fork and for the bin conveyor means.

The features and advantages of the invention may be understood from the following detailed description and the accompanying drawings.

BRIEF DESCRIPTION OF THE DRAWINGS

FIG. 5 is an elevational view of the highest level platform assembly as seen along the line 5—5 of FIG. 3;

FIG. 6 is a view similar to FIG. 3 showing a pair of the platforms of the highest level platform assembly extended in their opposite directions laterally of the vehicle;

FIG. 7 is a sectional view of the highest level platform assembly taken along the line 7—7 of FIG. 6;

FIG. 8 is a horizontal section along the line 8—8 of FIG. 7;

FIG. 9 is a horizontal section along the line 9—9 of FIG. 7;

FIG. 10 is an elevational view of the hoppers of a pair of platforms of the highest level platform assembly as seen along the line 10—10 of FIG. 2;

FIG. 11 is a fragmentary plan view of one of the hoppers as seen along the line 11—11 of FIG. 10;

FIG. 12 is a sectional view of the same hopper taken along the line 12—12 of FIG. 10;

BRIEF DESCRIPTION OF THE INITIAL EMBODIMENT OF THE INVENTION

General Arrangement

Figure 1:
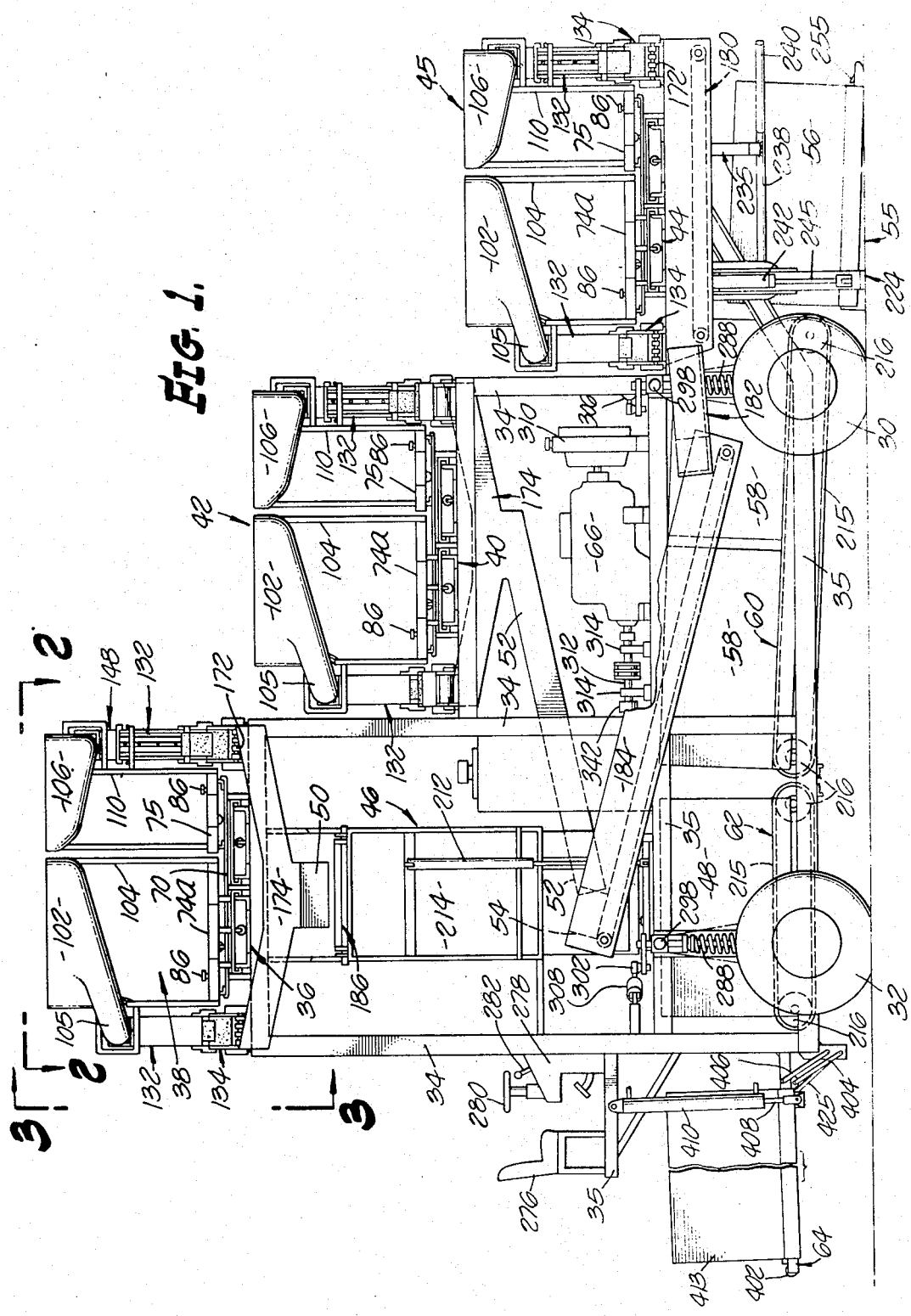
FIG. 1 is a side elevation of a vehicle incorporating the initial embodiment of the invention.

As shown in FIG. 1, the apparatus comprises a vehicle in the form of a framework mounted on a pair of forward ground wheels 30 and a pair of rear ground wheels 32. The framework comprises various vertical frame members 34 and horizontal frame members 35 and incorporates an uppermost base structure generally designated 36 for an uppermost platform assembly generally designated 38, an intermediate base structure generally designated 40 at an intermediate level for an intermediate platform assembly, generally designated 42, and a lowermost forward base structure 44 for a lowermost forward platform assembly generally designated 45.

An upright gravity conveyor, generally designated 46, is constructed to permit picked fruit to gravitate downwardly therethrough without damage to fill field bins at a bin-filling station on the vehicle, the bin-filling station being represented by a field bin 48. A chute 50 delivers fruit from the uppermost platform assembly 38 to the top of the gravity conveyor 46; a second chute 52 delivers fruit from the intermediate platform assembly 42 to a lower level of the gravity conveyor; and a third chute 54 delivers fruit from the lowest platform assembly 45 to the same lower level of the gravity conveyor.

FIG. 1 further shows a lift fork 55 at the front end of the vehicle that has picked up a field bin 56 from the ground in the path of forward movement of the vehicle. Two additional empty field bins 58 previously picked up by the lift fork 55 are on a forward bin conveyor 60 awaiting delivery to a rear bin conveyor 62 on which the previously mentioned field bin 48 rests at the bin-filling station. The successive completely filled bins at the bin-filling station are delivered by the rear bin conveyor 62 to discharge ramp means 64 at the rear end of the vehicle.

Various hydraulic pumps actuated by an internal combustion engine 66 provides hydraulic power for various purposes including: extension and retraction of the platforms of the three platform assemblies; actuation of various conveyors for delivering picked fruit to the three chutes 50, 52, and 54 that are associated with the gravity conveyor 46; downward extension and retraction of the gravity conveyor 46; actuation of the bin conveyors 60 and 62; actuation of the lift fork 55; actuation of bin-shifting means for shifting bins from the lift fork onto the rear conveyor 60; actuation of the discharge ramp means 64; actuation of the two pairs of ground wheels to propel the vehicle; and power steering for the two pairs of ground wheels.

CONSTRUCTION OF THE PLATFORM ASSEMBLIES

Each of the three base structures 36, 40, and 44 serves as a deck to support the corresponding platform assembly. Since all three of the platform assemblies 38, 42, and 45 are identical, it will suffice to describe the construction of the uppermost platform assembly 38 on the uppermost base structure 36.

As best shown in FIGS. 5 and 6, the base structure 36 has a lower deck 68 and an upper deck 70, the upper deck being supported from the lower deck by a plurality of short posts 72. As shown in plan in FIG. 2, the platform assembly 38 comprises a forward pair of oppositely extendable platforms 74 and 75 and a rearward pair of oppositely extendable platforms 74a and 75a, the two pairs being identical with the two platforms 75 and 75a diagonally opposite from each other and with the two platforms 74 and 74a diagonally opposite from each other.

Figure 2:
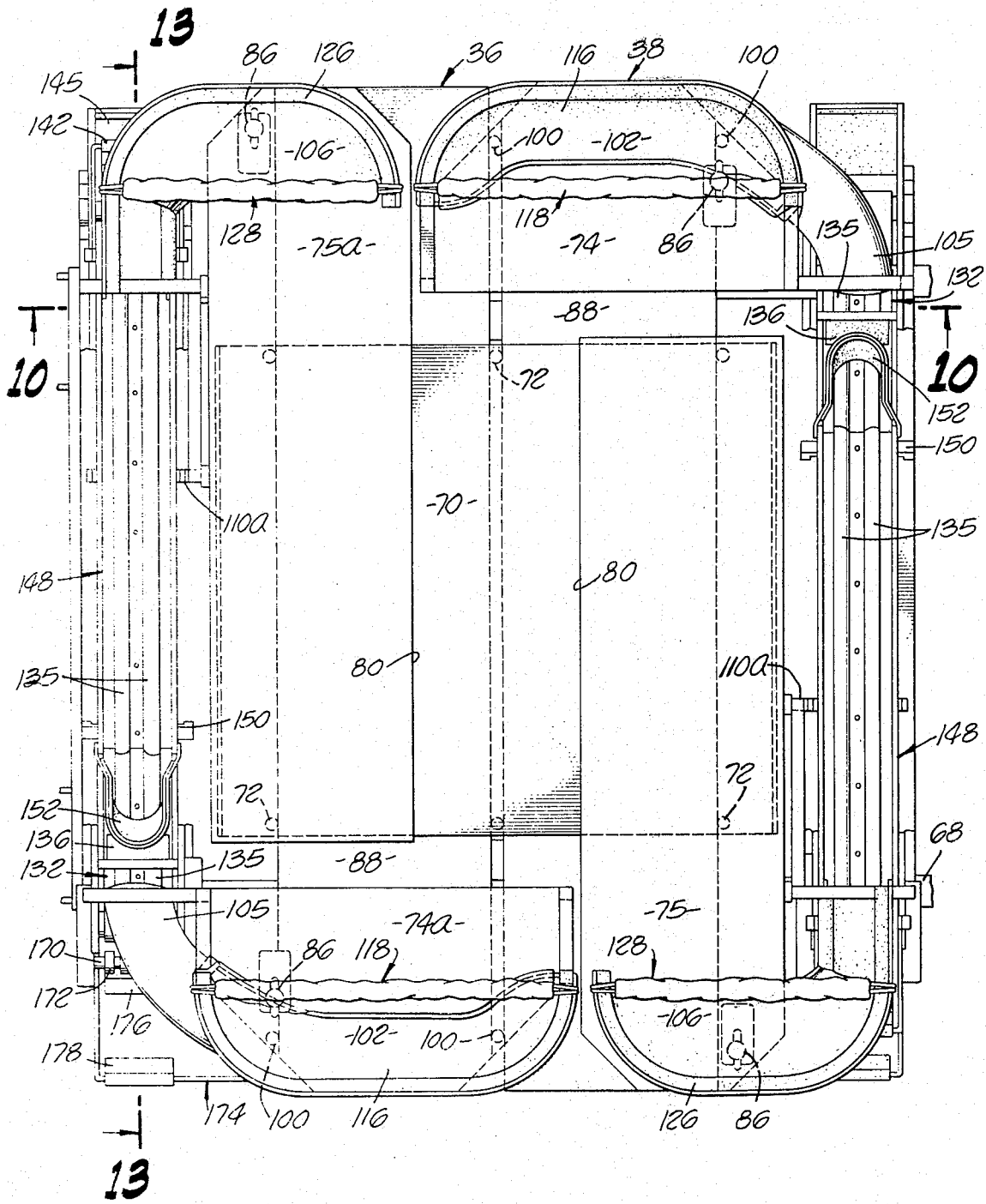
FIG. 2 is an enlarged plan view of the highest platform assembly as seen along the line 2—2 of FIG. 1.
Figure 3:
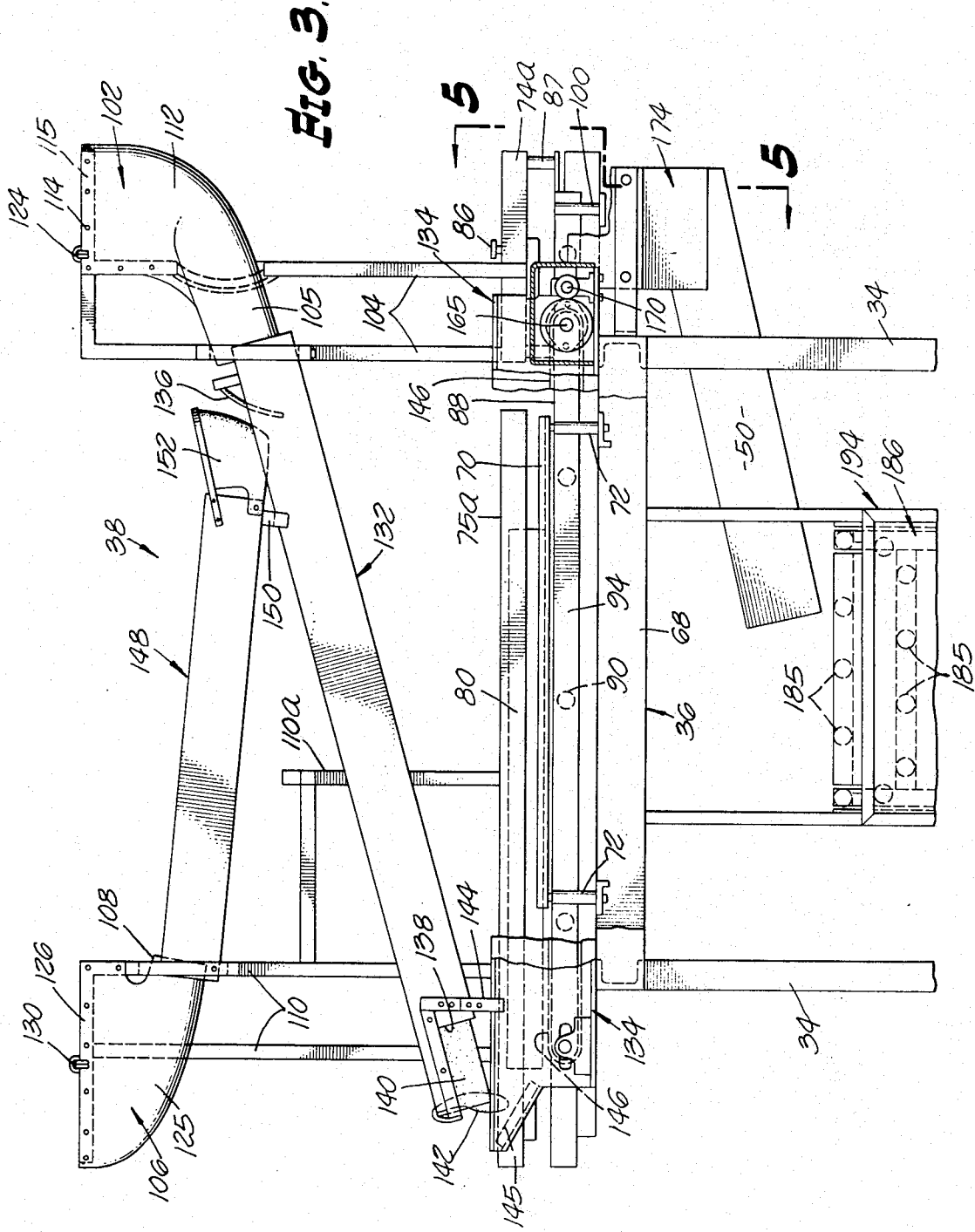
FIG. 3 is a fragmentary side elevational view of the highest level platform assembly as seen along the line 3—3 of FIG. 1.

As may be seen in FIG. 2, the two platforms 74 and 74a have relatively wide outer end floor portions, whereas the two platforms 75 and 75a are relatively narrow with full length floor surfaces. It is also to be noted that the four platforms have their floor surfaces in substantially the same horizontal plane. FIGS. 2 and 3 show the four platforms at their fully retracted positions and FIG. 6 shows the platforms extended.

Referring to FIGS. 5, 6, and 7, each of the two narrow platforms 75 and 75a is mounted on rollers 76 for extension and retraction and the rollers in turn are mounted on angle irons 78 on the upper deck 70 of the base structure. The two longitudinal sides of the two platforms 75 and 75a are bent to form corresponding inwardly turned channels 80 that enclose the rollers 76. When the two platforms 75 and 75a are fully retracted, upper walls of the channels 80 rest on the upper sides of the rollers 76, but when the platforms are fully extended, the upper walls of the channels fulcrum on the outermost pair of rollers and the lower walls of the channels press upwardly on the under surfaces of the innermost rollers.

For extension and retraction of each of the narrower platforms 75, 75a, each platform is connected to a corresponding piston rod 82 (FIG. 6) of a corresponding hydraulic power cylinder 84, the rear end of which is mounted on the upper deck 70 by a bracket 85. Each hydraulic cylinder 84 is controlled by a corresponding three-position foot pedal 86 which operates a corresponding four-way valve.

To make it possible for the outer end portion of the wider platforms 74 and 74a to be on the same level as the narrower platforms 75a, the wider platforms are mounted by posts 87 on corresponding lower support portions 88 which constitute extensions of the wider platforms and are slidingly mounted on the lower deck 68 of the base structure 36. As shown in FIGS. 5, 6, and 7, the lower support portions 88 of the wider platforms 74 and 74a are mounted on rollers 90 which in turn are mounted on angle irons 92 on the lower deck 68. The lower support portion 88 serve as auxiliary platforms and, in a manner heretofore described, the lower support portions 88 are formed with inwardly turned longitudinal side channels 94 which enclose the rollers 90. For power-actuated extension and retraction of the wider platforms 74 and 74a, each of the corresponding lower support portions 88 is connected to a corresponding piston rod 95 of a corresponding hydraulic cylinder 96, the rear end of which is mounted on the lower deck 68 by a bracket 98. Here again, each hydraulic cylinder 96 is controlled by a corresponding three-position foot pedal 86 which operates a corresponding four-way valve.

Each of the lower support portions 88 is confined between pairs of the previously mentioned posts 72 and between an additional pair of forward posts 100 (FIGS. 2, 3, and 6). As may be seen in FIG. 2, the lower support portions 88 of the wider platforms 74 and 74a can be retracted between the decks 68 and 70 and are largely masked by the narrower platforms 75 and 75a when all four of the platforms are retracted. When the wider platforms 74 are extended, however, as shown in FIG. 6, the upper surfaces of the lower support portions 88 are exposed to serve as auxiliary platforms on which a fruit picker may walk or stand.

As shown in FIGS. 1, 2, and 3, each of the wider platforms 74 and 74a of the three levels has a hopper 102 on its outer end to receive picked fruit, the hopper being supported at the level of a fruit picker's waist by means of an upwardly extending frame 104. Each of the hoppers 102 is formed with a discharge spout 105 to deliver the fruit to a fruit conveyor system which will be described later. In like manner, each of the narrower platforms 75 and 75a is provided with a hopper 106 at its outer end that has a discharge spout 108 and is supported waist-high by a frame 110.

Referring to FIGS. 10 and 11, each of the hoppers 102 on the wider platforms 74 and 74a may comprise a molded wall 112 of rigid plastic material, for example, a molded piece of fiberglass which forms the front and two sides of the hopper and which is attached by screws 114 to a member 115 of the frame 104. Preferably, the plastic wall 112 is equipped with a soft rubber liner 116.

The inner side of the hopper 102, which side is nearest to a picker on the platform, comprises a piece of flexible fabric 118, the lower edge of which is bonded to the plastic wall 112 by means including a flexible plastic strip 120. The upper portion of the fabric 118 is folded on itself to form a hem 122 which encloses a pair of elastic members 124 which are connected at their opposite ends to the frame 104. Thus, the portion of the hopper 102 that is nearest to a picker on a platform 74 or 74a is elastically yieldable so that if the picker leans against the inner side of the hopper the hopper will elastically conform to the configuration of the picker's body and make it a simple matter for the picker to drop fruit into the hopper.

Each of the hoppers 106 on the narrow platforms 75 and 75a is of similar construction. Thus, each hopper 106 has a rubber lined plastic wall 125 supported by a member 126 of the frame 110 and the hopper further has an inner wall of fabric 128 which is reinforced by concealed elastic members 130 (FIG. 3) which correspond to the elastic members 124 of the hoppers 102. As may be seen in FIG. 2, the leading end of each of the four platforms is formed by the forward outer wall of the corresponding hopper and this leading end as viewed in plan is of narrowed rounded configuration to form a smoothly contoured nose to facilitate extension of the platform into the foliage of a tree with minimum damage to the tree. The outer branches of a tree are highly flexible and are readily brushed to the two sides of an entering platform. The narrower platforms 75 and 75a penetrate the foliage more readily than the broader platforms 74 and 74a and where relatively deep penetration of the foliage is desired, a narrow platform rather than a wide platform is naturally advantageous and especially so if the leading end of the platform is rounded. Thus, with a wide platform making only shallow penetration of the foliage of a tree at the periphery of the tree, an adjacent narrow platform may be extended to further depth of the foliage. With the two extended side-by-side platforms staggered in this manner the two combine for harvesting a peripheral zone of the tree of relatively great radial depth. In regions where the main branches near the center of the tree make the center of the tree accessible, the narrower platform may be extended to the center of the tree. It is apparent then that there are important advantages in providing two platforms side by side that are independently extensible and it is further advantageous to have one of the two platforms relatively narrow.

FRUIT CONVEYOR SYSTEM

Referring to FIG. 3, each of the two hoppers 102 of the platform assemblies on the three levels discharges into a corresponding downwardly inclined chute 132 which in turn discharges into a corresponding horizontal side conveyor 134 on the corresponding side of the platform assembly, there being two such side conveyors on the forward and rearward sides respectively of each platform assembly. As shown in FIGS. 2 and 10, the bottom wall of each of the inclined chutes 132 is provided with a pair of longitudinal ribs 135 which divide the bottom of the chute into three longitudinal grooves or guideways for the gravitating fruit.

To minimize damage to the fruit as it is discharged from each hopper 102 into the corresponding chute 132, the upper end of the chute is provided with an overhanging flexible baffle 136 to slow down the movement of the fruit. The bottom wall of the chute is cut away as indicated at 138 to form an opening for discharge of the fruit into the corresponding side conveyor 134, this discharge opening being flanked by a pair of flexible flaps 140. The lower end of the chute 132 is provided with a bag 142 which is partially filled with water to act as a yielding buffer to decelerate the fruit without damage to the fruit.

Figure 13:
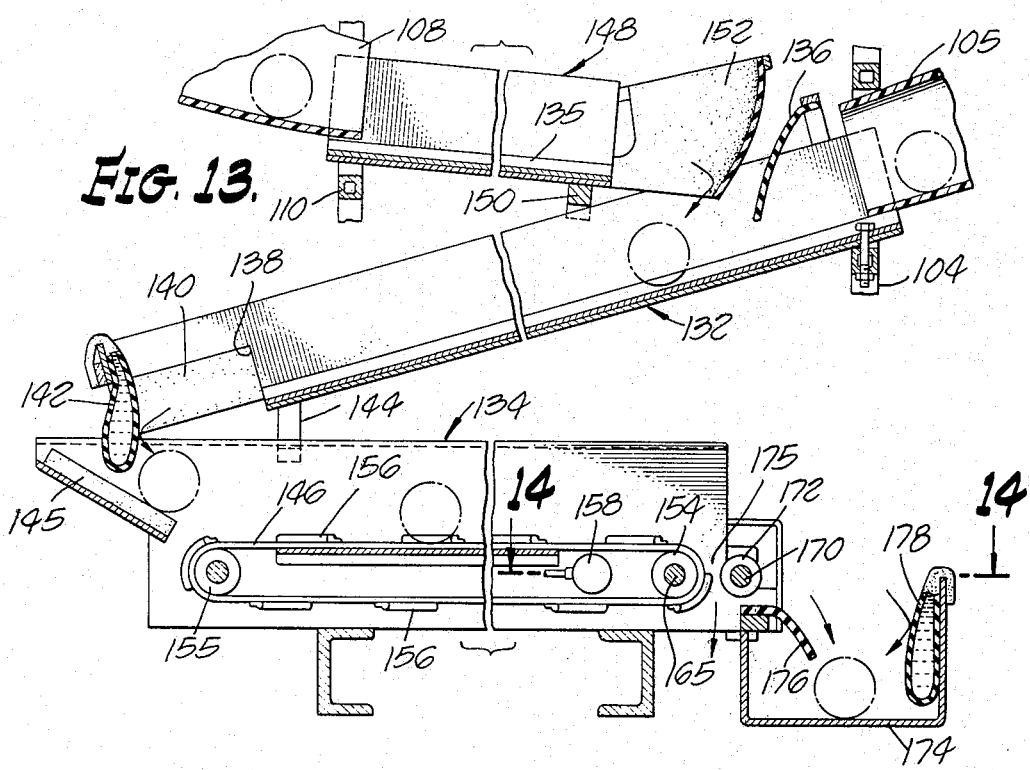
FIG. 13 is a fragmentary sectional view of portions of the highest level platform assembly taken along the line 13—13 of FIG. 2.

The lower end of each inclined chute 132 is supported by a bracket 144 that is slidable along the upper edges of the two side walls of the corresponding side conveyor 134, and when the lower end of the inclined chute is near the receiving end of the side conveyor as shown in FIGS. 3 and 13, the fruit that is decelerated by the bag 142 drops onto a plastic foam cushion 145 which diverts the fruit onto the belt 146 of the side conveyor.

Each of the hoppers 106 at the outer end of each of the narrow platforms 75 discharges into a corresponding inclined chute 148 which is of the same general construction as the inclined chutes 132 and which is positioned above the corresponding chute 132. The lower end of each of the chutes 148 is supported by a bracket 150 that is slidable along the top edges of the two side walls of the corresponding lower inclined chute 132. When the fruit gravitating down an upper chute 148 reaches the bottom of the chute, it is deflected by a rubber apron 152 into the corresponding lower chute 132.

FIG. 3 shows the positions of the inclined chutes 132 and 148 when the two corresponding platforms 74a and 75a are retracted and FIG. 6 shows the positions of the inclined chutes when the two platforms are extended. It will be noted in FIG. 6 that when the platform 75a is extended to its limit, the weight of the lower end of the chute 148 is transferred from the chute 132 to an extension 110a of the frame 110. It is apparent that the two chutes 132 and 148 accommodate themselves to the extension and retraction of the platforms by virtue of the sliding connection of the chute 148 with the chute 132 and the sliding connection of the chute 132 with the corresponding side conveyor 134.

It is apparent that each pair of chutes 132 and 148 comprises a chute assembly that expands and contracts to follow the extension and retraction of the corresponding platforms. It is also apparent that the discharge outlet of each chute assembly is movable along the length of the corresponding side conveyor 134 to accommodate the expansion and contraction of the chute assembly.

Figure 14:
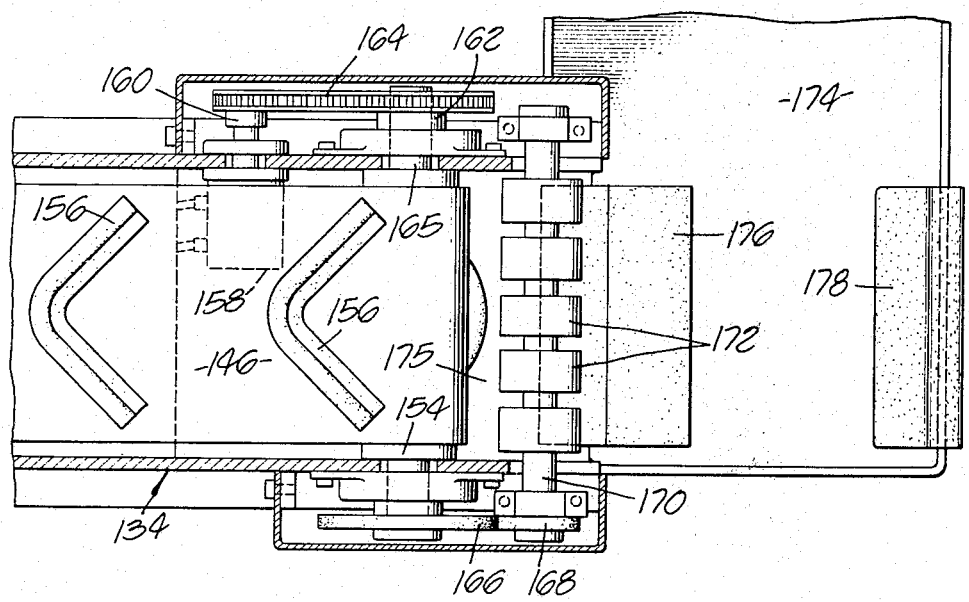
FIG. 14 is a fragmentary plan view, partly in section, as seen along the line 14—14 of FIG. 13.

The construction of each of the side conveyors 134 is best shown in FIGS. 13 and 14. The previously mentioned belt 146 passes around a drive roller 154 at the discharge end of the side conveyor and passes around an idler roller 155 at the receiving end of the side conveyor. Preferably, the belt 146 is provided with angular rubber cleats 156 to engage the fruit.

A hydraulic motor 158 drives a sprocket 160 which is connected to a second sprocket 162 by a sprocket chain 164, the second sprocket 162 being keyed to a drive shaft 165 that carries the drive roller 154. The second end of the drive shaft 165 carries a friction wheel 166 which peripherally engages a second friction wheel 168. The seceond friction wheel 168 drives a transverse countershaft 170 that carries a series of axially spaced rubber rollers 172.

Fruit that reaches the discharge end of each of the side conveyors 134 passes over the spaced rollers 172 to drop into a cross chute 174. Leaves, twigs, and other debris fall through the clearance space 175 between the end of the belt 146 and the rollers 172. Adjacent each of the side conveyors 134, the cross chute 174 is provided with a downwardly curved rubber flap 176 and the opposite side wall of the cross chute is provided with a water-filled bag 178 that cushions the fruit.

Figure 4:
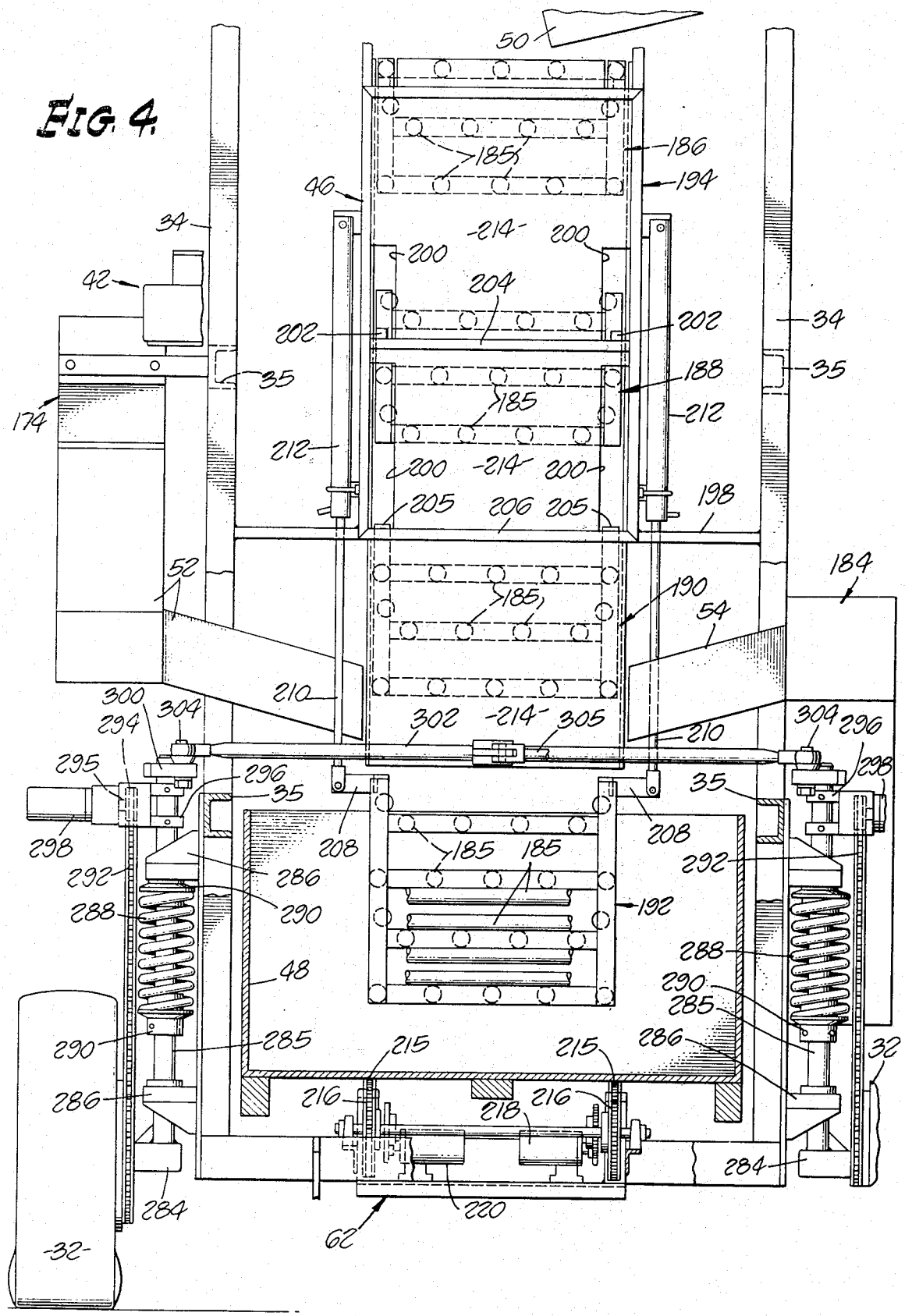
FIG. 4 is an elevational view of the structure below the highest level platform assembly showing the gravity conveyor that delivers fruit to the field bins at the filling station on the vehicle.

As shown in FIGS. 1, 3, and 4, the cross chute 174 of the uppermost platform assembly 38 has the previously mentioned discharge chute 50 that empties into the upper end of the gravity conveyor 46. As shown in FIGS. 1 and 4, the cross chute 174 of the platform assembly 42 at the intermediate level has the previously mentioned discharge chute 52 that enters the gravity conveyor 46 at a lower level.

As shown in FIG. 1, the two side conveyors 134 of the lowest level platform assembly 45 do not discharge into a cross chute, but instead discharge into a powered conveyor 180. The powered conveyor 180 is connected by a short gravity chute 182 with a second upwradly inclined powered conveyor 184 which, as indicated in FIGS. 1 and 4, is provided at its discharge end with the previously mentioned discharge chute 54 which directs the fruit into a lower level of the gravity conveyor 46. Each of the two conveyors 180 and 184 is of the same general construction as the side conveyors 134, each having a belt 146 provided with rubber cleats 156 and driven by a corresponding motor (not shown).

The gravity conveyor 46 which is shown in FIGS. 1 and 4 is an upright box-like structure that forms a vertical zone for gravitational movement of the fruit, the gravity conveyor having a plurality of barriers 185 that are distributed horizontally and vertically across the gravity zone to provide at spaced levels suitable openings through which the fruit may drop. The barriers which are of soft and resilient construction are positioned to repeatedly interrupt the free fall of the fruit to limit the distance of each free fall to a fraction of the total vertical distance through the gravity conveyor, the free falls being short enough to keep the fruit from accelerating to such high velocity as to be damaged by impact against the interrupting barriers.

Referring to FIG. 4, the gravity conveyor 46 is made in four sections comprising a top section 186, two intermediate sections 188 and 190, and a bottom section 192. The top section 186 is fixedly supported by an upright frame 194 that rests on transverse members 198 of the framework of the vehicle. The three upper sections 186, 188, and 190 are enclosed by a housing 214 that is open at its top and bottom and that has suitable side openings to receive fruit from the discharge chutes 52 and 54, and the bottom section 192 is movable upwardly from its normal position shown in FIG. 4 into the interior of the housing.

The intermediate section 188 slidingly engages upright guides in the form of four slots 200 in the housing 214 and is movable upwardly from its normal position shown in FIG. 4 towards the upper section 186. At the lower normal position of the intermediate section 188, it is supported by laterally extending guide lugs 202 thereof each of which extends into a slot 200 and rests on a horizontal frame member 204 that extends across the slot.

The second intermediate section 190 of the gravity conveyor is shown at its normal position in FIG. 4 where laterally extending torques 205 of the section that extend into the guide slots 200 rest on transverse frame members 206 that extend across the slot. The intermediate section 190 is movable upwardly from its normal lower position along the guide angles 200 towards the intermediate section 188.

The bottom section 192 of the gravity conveyor 46 is supported by brackets 208 on the lower ends of corresponding piston rods 210 which extend downwardly from corresponding hydraulic cylinders 212, the hydraulic cylinders being mounted on opposite sides of the fixed frame 194.

FIG. 4 shows the gravity conveyor 46 retractably extended downwardly into the previously mentioned field bin 48 at the bin-filling station of the apparatus. As the field bin gradually fills with fruit, the lower end of the gravity conveyor 46 is progressively retracted upwardly and is eventually elevated sufficiently to clear the top of the field bin as the field bin fills with fruit. The upward retraction of the gravity conveyor 46 is accomplished by the hydraulic cylinders 212, the bottom section 192 being drawn upwardly by the brackets 208 moving along slots in the side walls of the housing 214. First the bottom section 192 moves against the underside of the intermediate section 190 and lifts the intermediate section 190 against the next intermediate section 188 and then the three lower sections move in unison towards the top fixed section 186. The maximum distance of free fall of the fruit inside the gravity conveyor 46 is the distance between the sections when the sections are at their maximum spacing shown in FIG. 4, but this free fall distance is short enough to keep the fruit from being damaged by impact agianst the soft barriers 185.

THE BIN HANDLING SYSTEM

As shown in FIG. 4, the rear bin conveyor 62 at the filling station comprises a pair of parallel closed loops of sprocket chain 215 engaged by sprockets 216 that are actuated by a fluid motor 218. The forward bin conveyor 60 is of similar construction having two conveyor chains 215 on similar sprockets 216 driven by a second fluid motor 220.

As heretofore stated, the function of the lift fork 55 is to pick up empty field bins from the ground in the path of travel of the vehicle and to deliver the empty bins to the forward conveyor 60 for conveyance to the filling station on the rear conveyor 62.

Our description in specific detail of the selected embodiment of the invention will suggest various changes, substitutions and other departures from our disclosure within the spirit and scope of the invention.

We claim:

1. In an apparatus of the character described to facilitate picking fruit from trees, the combination of:
   a vehicle having ground wheels;
   a plurality of platforms at different levels on the vehicle to support fruit-picking workmen;
   hoppers mounted on the various platforms to receive the picked fruit,
   each hopper being at a height relative to the corresponding platform that is intermediate the height of a workman on the platform and having an inner wall to permit the workman to lean against the hopper, said inner wall of each hopper being resiliently flexible to yield to the leaning workman by bowing outwardly over the hopper to conform to the configuration of the leaning workman's body.

2. In an apparatus to facilitate harvesting fruit from trees, the combination of:

a vehicle having ground wheels;

a first platform on the vehicle movable transversely of the vehicle from a retracted position to a position extending from one side of the vehicle;

a second platform on the vehicle movable transversely of the vehicle from a retracted position to a position extending from the other side of the vehicle, the paths of extension and retraction of the two platforms being at slightly different levels to avoid interference with each other with portions of the two platforms measured along their directions of travel overlapping at their retracted positions hoppers on the two platforms respectively to receive picked fruit; and means to transport fruit from the hoppers to at least one collection station on the vehicle;

one of said two platforms having an outer end portion at substantially the same level as the level of the other of the two platforms;

and said other of said two platforms having a support portion at a lower level than said one platform and underlying said one platform at the retracted positions of the two platforms.

3. A combination as set forth in claim 2 in which the length of each of the two platforms is not substantially greater than the width of the vehicle as defined by the ground wheels of the vehicle.

4. A combination as set forth in claim 2 which includes:

a third platform alongside the first platform and movable in the same manner between retracted and extended positions independently of the first platform;

and a fourth platform alongside the second platform movable in the same manner between retracted and extended positions independently of the second platform, the paths of extension and retraction of the third and fourth platforms being at slightly different levels with major portions of the third and fourth platforms measured along their directions of travel overlapping at their retracted positions.

5. Apparatus as defined in claim 2 including:

a fixedly mounted elevated deck on the vehicle within the width dimension of the vehicle, and wherein said first platform at its retracted position overlies the deck; and said second platform at its retracted position underlies the deck.

6. A combination as set forth in claim 2 in which the first platform has a floor surface that extends substantially the full length thereof.

7. A combination as set forth in claim 2 which includes:

a third movable platform alongside the first platform and movable in the same manner between retracted and extended positions independently of the first platform; and a fourth movable platform alongside the second movable platform and movable in the same manner between retracted and extended positions independently of the second platform, the third movable platform at its retracted position overlying the fixedly mounted platform, the fourth platform at its retracted position underlying the fixedly mounted platform.

8. In a mobile apparatus of the character described to travel along a row of fruit trees to facilitate harvesting fruit from the trees, wherein the apparatus has at least one elevated platform to support at least one fruit-picking workman with means on the outer end of the platform towards the trees to receive the picked fruit, the improvement for increased convenience and comfort on the part of the workman as well as increased picking efficiency, comprising:

said fruit receiving means being hopper means on the outer end of the platform;

said hopper means being at a height above the platform that is intermediate the height of the workman to permit the workman to lean against the hopper means outwardly of the platform towards the trees to reach fruit on the trees, at least a portion of the wall of the hopper means being resiliently flexible to yield to the leaning workman by bowing outward over the hopper means from a normally retracted position to increase his reach towards the trees.

9. An improvement as set forth in claim 8 in which the top edge of said portion of the wall of the hopper means is approximately at the level of the waist of the workman.

10. An improvement as set forth in claim 8 in which the outer wall of the hopper means is relatively rigid to penetrate a tree and to displace foliage of the tree to facilitate access by the workman to fruit on the tree.

11. An improvement as set forth in claim 10 in which the rigid wall of the hopper means is provided with a liner of elastomeric sheet material.

12. An improvement as set forth in claim 8 in which said hopper means is on the front outer end of the platform and discharges the received fruit rearwardly of the platform along one side of the platform.

13. A combination as set forth in claim 12 in which the bottom wall of the hopper slopes downward towards said one side of the platform.

14. An improvement as set forth in claim 13 in which said hopper means is formed with a rearwardly directed discharge spout on said one side of the platform.

15. An improvement as set forth in claim 12 which includes transport means to transport the fruit from the hopper means to a bin-filling station on the mobile apparatus.

16. An improvement as set forth in claim 15 in which said transport means includes downwardly inclined chute means extending from the hopper means along said one side of the platform.

17. An improvement as set forth in claim 16 in which the platform along with the downwardly inclined chute means is extendable in one direction from the mobile apparatus towards the trees;

in which a conveyor is positioned below the chute means and aligned with the chute means and is power driven to convey the fruit in said one direction;

and in which the lower end of the chute means discharges into the conveyor and is movable longitudinally of the conveyor to accommodate extension and retraction of the platform.

18. An improvement as set forth in claim 16 which includes yielding buffer means near the lower end of the chute means in the path of gravitation of the fruit to stop the travel of the fruit without damage to the fruit.

19. An improvement as set forth in claim 18 in which the bottom of the chute means is open immediately in front of the buffer means to permit the stopped fruit to drop out of the chute means.

20. An improvement as set forth in claim 18 which includes yieldable baffle means in the chute means between the hopper means and the buffer means to impede the gravitational movement of the fruit towards the buffer means.

21. In an apparatus to facilitate harvesting fruit from trees, the combination of:
   a vehicle having ground wheels;
   a first platform on the vehicle movable transversely of the vehicle from a retracted position to a position extending from one side of the vehicle;
   a second platform on the vehicle movable transversely of the vehicle from a retracted position to a position extending from the other side of the vehicle;
   the paths of extension and retraction of the two platforms being at slightly different levels with major portions of the two platforms measured along their directions of travel overlapping at their retracted positions;
   hoppers on the two platforms respectively to receive picked fruit; and
   means to transport fruit from the hoppers to at least one collection station on the vehicle,
   said means to transfer fruit from the hoppers including:
      a first chute from the hopper on one platform inclining downward towards the other platform; and
      a second chute from the hopper on the other platform inclining downward towards said one platform and discharging into the first chute,
      the lower end of the second chute movably resting on the first chute to shift along the first chute in response to changes in the distance between the two hoppers as the two platforms extend and retract.

22. A combination as set forth in claim 21 which includes conveyor means to receive fruit from the first chute,
   the lower end of the first chute movably resting on the conveyor means to shift along the conveyor means in response to extension and retraction of said one platform.

23. In an apparatus of the character described to facilitate picking fruit from trees, the combination of:
   a vehicle having ground wheels;
   a plurality of platforms at different levels on the vehicle to support fruit-picking workmen;
   hoppers mounted on the various platforms to receive the picked fruit,
   each hopper being at a height relative to the corresponding platform that is intermediate the height of a workman on the platform to permit the workman to lean against the hopper,
   each hopper having a wall that is resiliently flexible to yield to the leaning workman whereby the wall conforms to the configuration of the workman's body,
   said wall being made of flexible sheet material and the top edge of the wall being supported by elongated elastic means which is anchored at its opposite ends to fixed structure.

24. In an apparatus to facilitate harvesting fruit from trees, the combination of:
   a vehicle having ground wheels;
   a first platform on the vehicle movable transversely of the vehicle from a retracted position to a position extending from one side of the vehicle;
   a second platform on the vehicle movable transversely of the vehicle from a retracted position to a position extending from the other side of the vehicle;
   a third platform alongside the first platform and movable in the same manner between retracted and extended positions independently of the first platform;
   a fourth platform alongside the second platform movable in the same manner between retracted and extended positions independently of the second platform,
   the paths of extension and retraction of the first and second platforms being at slightly different levels with major portions of the two platforms measured along their directions of travel overlapping in their retracted position,
   the paths of extension and retraction of the third and fourth platforms being at slightly different levels with the major portions of the third and fourth platforms measured along their directions of travel overlapping at their retracted positions,
   the first and third platforms being relatively narrow and the second and fourth platforms being relatively broad to afford a choice between extending a relatively narrow platform or a relatively broad platform into the configuration of a fruit tree;
   hoppers on the four platforms respectively to receive picked fruit; and
   means to transport fruit from the hoppers to at least one collection station on the vehicle.

25. In a mobile apparatus of the character described to travel along a row of fruit trees to facilitate harvesting fruit from the trees, wherein the apparatus has at least one elevated platform to support at least one fruit-picking workman with means on the outer end of the platform towards the trees to receive the picked fruit,
   the improvement for increased convenience and comfort on the part of the workman as well as increased picking efficiency, comprising:
   said fruit receiving means being hopper means on the outer end of the platform;
   said hopper means being at a height above the platform that is intermediate the height of the workman to permit the workman to lean against the hopper means outwardly of the platform towards the trees to reach fruit on the trees, at least a portion of the wall of the hopper means being resiliently flexible to yield to the leaning workman to increase his reach towards the trees, said portion of the wall of the hopper means being elastically yieldable as well as resiliently flexible to stretch in response to the leaning of the workman to conform to the configuration of the workman's body and to store energy to facilitate disengagement of the workman from the wall when he so desires.

26. In a mobile apparatus of the character described to travel along a row of fruit trees to facilitate harvesting fruit from the trees, wherein the apparatus has at least one elevated platform to support at least one fruit-picking workman with means on the outer end of the platform towards the trees to receive the picked fruit, the improvement for increased convenience and comfort on the part of the workman as well as increased picking efficiency, comprising:

said fruit receiving means being hopper means on the outer end of the platform;

said hopper means being at a height above the platform that is intermediate the height of the workman to permit the workman to lean against the hopper means outwardly of the platform towards the trees to reach fruit on the trees, at least a portion of the wall of the hopper means being resiliently flexible to yield to the leaning workman to increase his reach towards the trees, said hopper means including rigid structure, said portion of the wall of the hopper means including its top edge being made of flexible sheet material, the top edge of said portion of the wall of the hopper being supported by elongated elastic means anchored at its opposite ends to said fixed structure.

27. An improvement as set forth in claim 26 in which the upper margin of said flexible sheet material forms a hem with the elongated elastic means inside the hem.

28. In a mobile apparatus of the character described to travel along a row of fruit trees to facilitate harvesting fruit from the trees, wherein the apparatus has at least one elevated platform to support at least one fruit-picking workman with means on the outer end of the platform towards the trees to receive the picked fruit, the improvement for increased convenience and comfort on the part of the workman as well as increased picking efficiency, comprising:

said fruit receiving means being hopper means on the outer end of the platform;

said hopper means being at a height above the platform that is intermediate the height of the workman to permit the workman to lean against the hopper means outwardly of the platform towards the trees to reach fruit on the trees, at least a portion of the wall of the hopper means being resiliently flexible to yield to the leaning workman to increase his reach towards the trees, said hopper means being on the front outer end of the platform and discharging the received fruit rearwardly of the platform along one side of the platform;

the provision of transport means to transport the fruit from the hopper means to a bin-filling station on the mobile apparatus, said transport means including downwardly inclined chute means extending from the hopper means along said one side of the platform;

the provision of yielding buffer means near the lower end of the chute means in the path of gravitation of the fruit to decelerate the fruit, said buffer means comprising a flexible bag containing a liquid to yield to impact by the gravitating fruit.

29. In an apparatus to facilitate harvesting fruit from trees, the combination of:

a vehicle having ground wheels;

a first platform on the vehicle movable transversely of the vehicle from a retracted position to a position extending from one side of the vehicle;

a second platform on the vehicle movable transversely of the vehicle from a retracted position to a position extending from the other side of the vehicle, the paths of extension and retraction of the two platforms being at slightly different levels with major portions of the two platforms measured along their directions of travel overlapping at their retracted positions;

hoppers on the two platforms to receive picked fruit; and means to transport fruit from the hoppers to at least one collection station on the vehicle;

said means to transport fruit from the hoppers including conveyor means adjacent the two platforms, said transport means further including a chute assembly to deliver fruit from the hoppers to the conveyor means, each of said chute assemblies being expandable and contractible to follow the extension and retraction of the two platforms.

30. A combination as set forth in claim 29, in which each of said chute assemblies has at least one discharge outlet movable along the corresponding conveyor means to accommodate expansion and contraction of the chute assembly.

31. In an apparatus to facilitate harvesting fruit from trees, the combination of:

a vehicle having ground wheels for movement along rows of orchard trees;

a plurality of pairs of work platforms disposed on each side of the vehicle at different fixed levels with the pairs staggered longitudinally of the vehicle, the platforms of each pair being positioned side by side, said platforms being extensible individually laterally of the vehicle towards and away from the vehicle;

hoppers on the leading ends of the platforms to receive picked fruit;

means to transport fruit from the hoppers to at least one collection station on the vehicle, one platform of each pair of platforms being narrower than the other platform of the pair to facilitate greater penetration of the foliage of a tree and being rounded in plan on its leading end to divert foliage of the tree to opposite sides of the penetrating platform to minimize damage to the foliage; and power means controllable from the leading ends of the platforms for independent extension and retraction of the platforms.

32. A combination as set forth in claim 5, which includes:

a first pair of parallel rows of rollers at fixed locations above the level of the deck supported by the deck with the rows extending longitudinally of the first movable platform;

a first pair of longitudinal channel walls on the first movable platform positioned to engage the first pair of rows of rollers respectively from the upper sides of the rollers;

a second pair of longitudinal channel walls on the first movable platform positioned to engage the first pair of rows of rollers respectively from the lower sides of the rollers, whereby when the first movable platform is retracted it is supported by the first pair of channel walls resting on the upper sides of the rollers of the first pair of rows of rollers and when the first movable platform is extended, the first pair of channel walls fulcrum on rollers of the first pair of rows and the second pair of channel walls engage rollers of the first pair of rows of rollers from the undersides of the rollers;

a second similar pair of parallel rows of rollers below the level of the deck;

a third pair of channel walls on the second movable platform to engage the rollers of the second pair of rows of rollers from the upper sides thereof; and a fourth pair of channel walls on the second movable platform to engage the rollers of the second pair of rollers from the lower sides thereof, whereby the retracted second movable platform is supported by the third pair of channel walls resting on the upper sides of rollers of the second pair of rollers and when the second movable platform is extended, the third pair of channel walls fulcrum on rollers of the second pair of rollers and the fourth pair of channel walls engage rollers of the second pair of rows of rollers from the undersides thereof.

33. A combination as set forth in claim 32 in which each of the movable platforms has flooring over substantially the full length of the platform.

* * * * *